United States Patent
Backendorf

(10) Patent No.: US 8,052,212 B2
(45) Date of Patent: Nov. 8, 2011

(54) SEAT FOAM WITH SENSOR MAT

(75) Inventor: Serge Backendorf, Sanem (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 130 days.

(21) Appl. No.: 12/066,307

(22) PCT Filed: Sep. 7, 2006

(86) PCT No.: PCT/EP2006/066136
§ 371 (c)(1),
(2), (4) Date: Mar. 10, 2008

(87) PCT Pub. No.: WO2007/028819
PCT Pub. Date: Mar. 15, 2007

(65) Prior Publication Data
US 2008/0252117 A1    Oct. 16, 2008

(30) Foreign Application Priority Data
Sep. 8, 2005  (EP) .................................. 05108266

(51) Int. Cl.
*A47C 31/00* (2006.01)
(52) U.S. Cl. .................................................. 297/217.3
(58) Field of Classification Search ............... 297/217.1, 297/217.3
See application file for complete search history.

(56) References Cited

U.S. PATENT DOCUMENTS

| | | | | |
|---|---|---|---|---|
| 6,108,842 | A * | 8/2000 | Severinski et al. | 5/653 |
| 6,476,514 | B1 * | 11/2002 | Schondorf | 307/10.1 |
| 6,659,549 | B1 * | 12/2003 | Still et al. | 297/217.3 |
| 6,877,808 | B2 * | 4/2005 | Lichtinger et al. | 297/217.3 |
| 6,953,224 | B2 * | 10/2005 | Seto et al. | 297/217.3 |
| 6,964,205 | B2 * | 11/2005 | Papakostas et al. | 73/862.046 |
| 2002/0067064 | A1 | 6/2002 | Jaillet et al. | |
| 2003/0189362 | A1 | 10/2003 | Lichtinger et al. | |
| 2003/0214161 | A1 * | 11/2003 | Seto et al. | 297/217.3 |
| 2005/0110312 | A1 | 5/2005 | Pinkos | |

FOREIGN PATENT DOCUMENTS

| | | |
|---|---|---|
| EP | 0135698 A1 | 4/1985 |
| EP | 0 785 101 | 7/1997 |
| EP | 1356983 A1 | 10/2003 |
| JP | 2004-50956 A * | 2/2004 |
| WO | 99/58023 | 11/1999 |

OTHER PUBLICATIONS

International Search Report; PCT/EP2006/066136; Feb. 16, 2007.

* cited by examiner

*Primary Examiner* — David Dunn
*Assistant Examiner* — Tania Abraham
(74) *Attorney, Agent, or Firm* — Cantor Colburn LLP

(57) ABSTRACT

In an assembly of a seat foam and a sensor mat, the seat foam has at least one incision and the sensor mat has at least one anchor tab adapted to be inserted into the at least one incision, thereby securely holding the sensor mat on a surface of the seat foam, where the seat foam includes at least one retaining element at the incision for retaining the anchor tab in the incision.

10 Claims, 4 Drawing Sheets

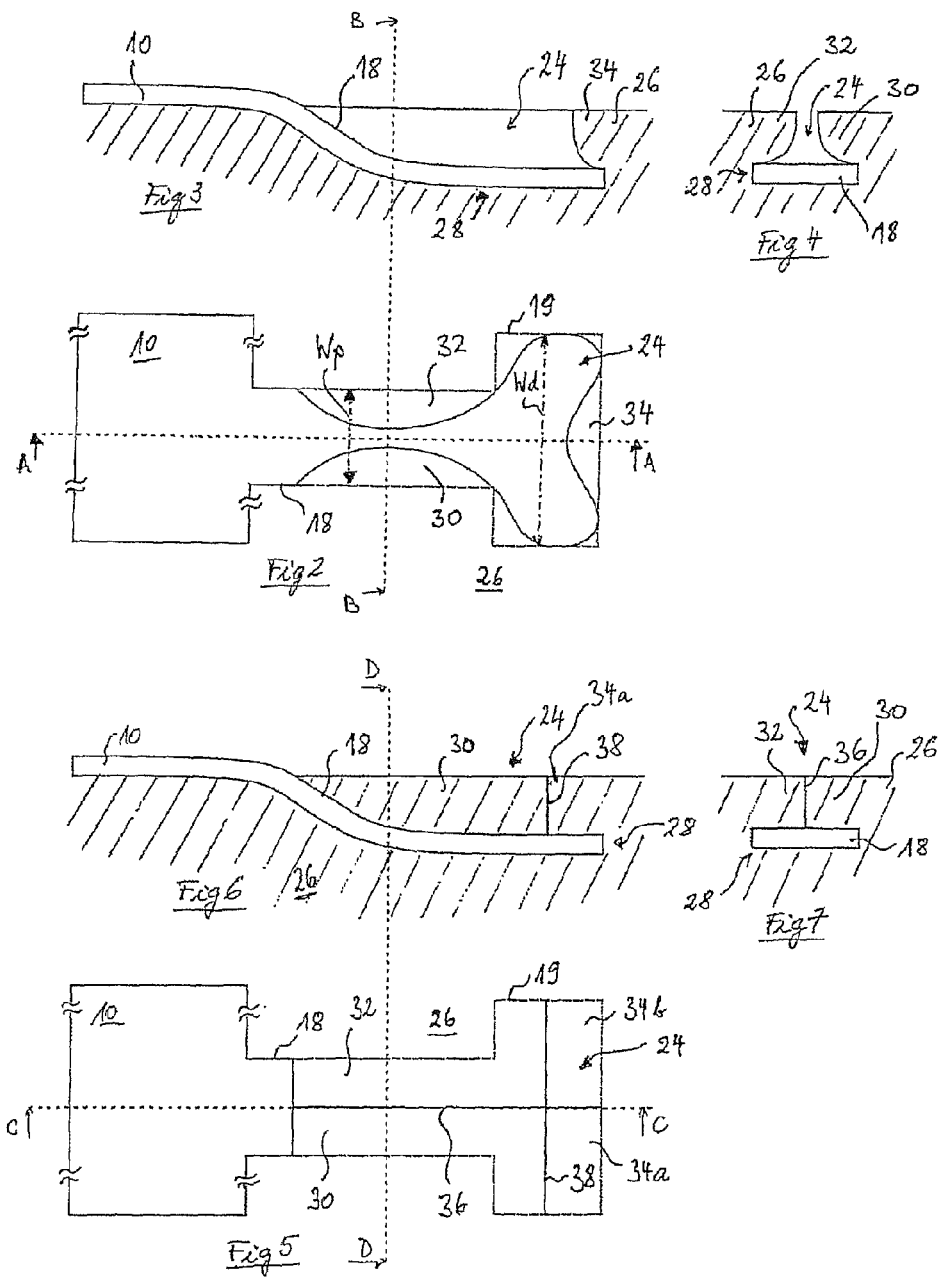

SEAT FOAM WITH SENSOR MAT

TECHNICAL FIELD

The present invention generally relates to the fixation of a sensor mat to a foam body and more particularly to an assembly of seat foam and sensor mat.

BRIEF DESCRIPTION OF RELATED ART

Sensor mats are used within automotive vehicles to determine whether occupants are currently residing in the various seats of the vehicle. These sensor mats typically communicate signals describing vehicle occupant information (e.g. describing which seats are currently occupied) to a controller, such as a vehicle control unit, which receives the signals and utilises the vehicle occupant information to engage in or to refrain from taking certain actions (e.g. enabling or disabling a secondary restraint system).

Such sensor mats are typically placed on the seat foam or cushion during the assembly of the seat by use of attachment devices such as double-sided tape or Velcro. One drawback of such fixations is that after production, the seat foam may be fully or partly covered with an oil film, which is used for facilitating the detaching of the foam body from the mould. The oil film may be chemically aggressive and/or act as an anti-adhesive, which leads to problems with traditional fixations: they may disengage, causing the sensor to move relative to the seat foam or cushion. Precise positioning of the sensor mat is another problem encountered with common fixation methods.

U.S. Pat. No. 6,659,549 discloses a seat sensor including a pressure sensing mat, and several barbed members or tabs which are integrally formed within the sensing mat. The sensor is adapted to be operatively installed on a vehicle seat. In order to install the sensor, several holes or cavities are formed within the foam of the seat prior to assembly, and the tabs are forced into the cavities. Once the tabs are inserted into the cavities, barbed portions "spring" outward against the sides of the cavities, thereby frictionally engaging and/or piercing the sides of the cavities and securing the seat sensor to the seat.

While certain problems of traditional fixations appear to be resolved by the measures proposed in U.S. Pat. No. 6,659,549, new problems arise. One drawback associated with this type of sensor mats is that the plastic material they are made of may lose flexibility and become brittle when ageing, whereby the "spring" properties of the barbed portion degrade. Moreover, when the tabs are engaged into the corresponding cavity, they are strongly deformed or compressed. Under the repeated loading and relief of the seat by occupants, causing additional bending and creasing of the tabs, the latter are likely to be damaged or even break. It can be concluded that there is a need for an alternative solution of the fixation problem.

BRIEF SUMMARY OF THE INVENTION

The invention provides an improved assembly of seat foam and a sensor mat.

In an assembly of a seat foam and a sensor mat, the seat foam has at least one incision and the sensor mat has at least one anchor tab adapted to be inserted into the at least one incision, thereby securely holding the sensor mat on a surface of the seat foam. According to the invention, the seat foam comprises at least one retaining element at the incision for retaining the anchor tab in the incision. When inserted into the incision, which can be a cavity or narrow cut a in the seat foam, the retaining element maintains the anchor tab securely lodged in the incision. The retaining element preferably comprises a foam lobe or foam obstacle protruding into the incision and operationally abutting against the anchor tab. Preferably, the sensor mat has a plurality of anchor tabs and the seat foam correspondingly a plurality of incisions so as to strengthen the sensor mat fixation and oppose to any rotational movement of the sensor mat. As will be appreciated, the invention allows precise and reproducible positioning of the sensor mat on the foam body. The invention further provides safe, i.e. durable, positioning without use of expensive adhesive and/or felt layers. Yet another advantage is that the sensor mat is removably attached to the foam. In case the sensor mat reveals itself as defective, one may replace the sensor mat may by a new one without changing the seat foam.

The incision advantageously comprises a channel for accommodating the anchor tab that extends from the surface of the seat foam into the seat foam in a direction heading away from the sensor mat and the retaining element comprises a foam portion, e.g. a foam lobe, between the channel and the surface. The maximal angle between the surface and the channel preferably does not exceed 45 degrees; more preferably, it is comprised between 10 and 30 degrees. The transitions between horizontal (i.e. parallel to the surface of the seat foam where the sensor mat is placed upon) and oblique sections of the channel can be smooth, so that the anchor tab is not subjected to excessive bending.

The sensor mat preferably comprises at least a second anchor tab diametrically opposed to the first anchor tab with respect to the sensor mat. The seat foam accordingly presents a second incision to receive the second anchor tab, so that neither tab accidentally slips out of its respective channel.

Between the surface and the channel, the incision may comprise a slit, which extends along the channel and connects the latter to the surface of the foam body. In this case, the anchor tab can be inserted into the channel through that slit. The slit may extend over substantially the entire channel length or only part of it. The roof of the channel, i.e. the foam portion between the channel and the surface thus comprises at least one lobe at least partially overlapping the channel, which serves as retaining element. Alternatively, the channel has a closed roof as retaining element: the anchor tab is then inserted along the channel. The advantage of lobes totally overlapping the channel or a closed channel roof is that the incision is less perceptible by touch.

The channel may comprise a proximal region and a distal region, the distal region being farer away from the sensor mat than the proximal region. According to a preferred embodiment of the invention, the channel is broader in the distal region than in the proximal region, i.e. the width of the channel increases either smoothly or stepwise from the proximal to the distal region. Accordingly, the anchor tab may comprise a stem corresponding to the proximal region and a head corresponding to the distal region, the head being broader than the proximal region of the channel. The anchor tab is thereby prevented from accidentally slipping out of the channel. Preferably, the distal region is as broad or broader than the anchor head, so that the latter is not subjected to permanent bending when in place. Similarly, the proximal region of the channel may be broader than the stem of the anchor tab. For insertion of the anchor tab, the above-described slit between the surface and the channel proves to be advantageous. One may also gently bend the anchor head for passing it through the narrower sections and release it in the broader sections of the channel. The anchor tab becomes thus trapped in the incision. This kind of fixation is particularly safe as it requests dedicated action for loosening it. In a preferred variant, the channel is substantially T-shaped, or comprises at least a so-shaped portion. Accordingly, the anchor tab can be substantially T-shaped. It shall be noted that, in the present context, "T-shape" is intended to encompass slight departures from the strict shape of a T, like, for instance, Y- or arrow-shapes.

The anchor tab can be removably fixed to the sensor mat but, preferably, it is integrally formed with the sensor mat, e.g. by punching. In order to provide increased frictional adhesion to the seat foam, the anchor tab may additionally comprise a roughened surface and/or contour. A roughened contour could comprise hooklets, which would engage the foam material when the anchor tab is put into place.

According to a preferred embodiment of the invention, the incision comprises a cavity extending substantially vertically (e.g. at an angle of about 75 to 90 degrees) with respect to the surface from the surface into the seat foam. The cavity in this case comprises an upper portion and a lower portion, said upper portion being substantially narrower than said lower portion, so that the head of the anchor tab is trapped in the lower portion when properly inserted into the cavity. The retaining element is in this case the foam portion that is located circumferentially around the upper portion and that overlaps the lower portion of the cavity.

It should furthermore be noted that, for instance in order to increase a passenger's comfort, the seat foam may be covered with a textile layer on which the sensor mat is disposed. Such a textile layer comprises preferably a three-dimensional spacer fabric.

BRIEF DESCRIPTION OF THE DRAWINGS

A preferred embodiment of the invention will now be described, by way of example, with reference to the accompanying drawings in which:

FIG. 2: is a top view of an anchor tab inserted into an incision in the seat foam according to a first embodiment of the invention;

FIG. 3: is a longitudinal cross-sectional view along the line A-A of FIG. 2;

FIG. 4: is a transversal cross-sectional view along the line B-B of FIGS. 2 and 3;

FIG. 5: is a top view of an anchor tab inserted into an incision in the seat foam according to a second embodiment of the invention;

FIG. 6: is a longitudinal cross-sectional view along the line C-C of FIG. 5;

FIG. 7: is a transversal cross-sectional view along the line D-D of FIGS. 5 and 6;

DETAILED DESCRIPTION OF THE INVENTION

Figure 1:
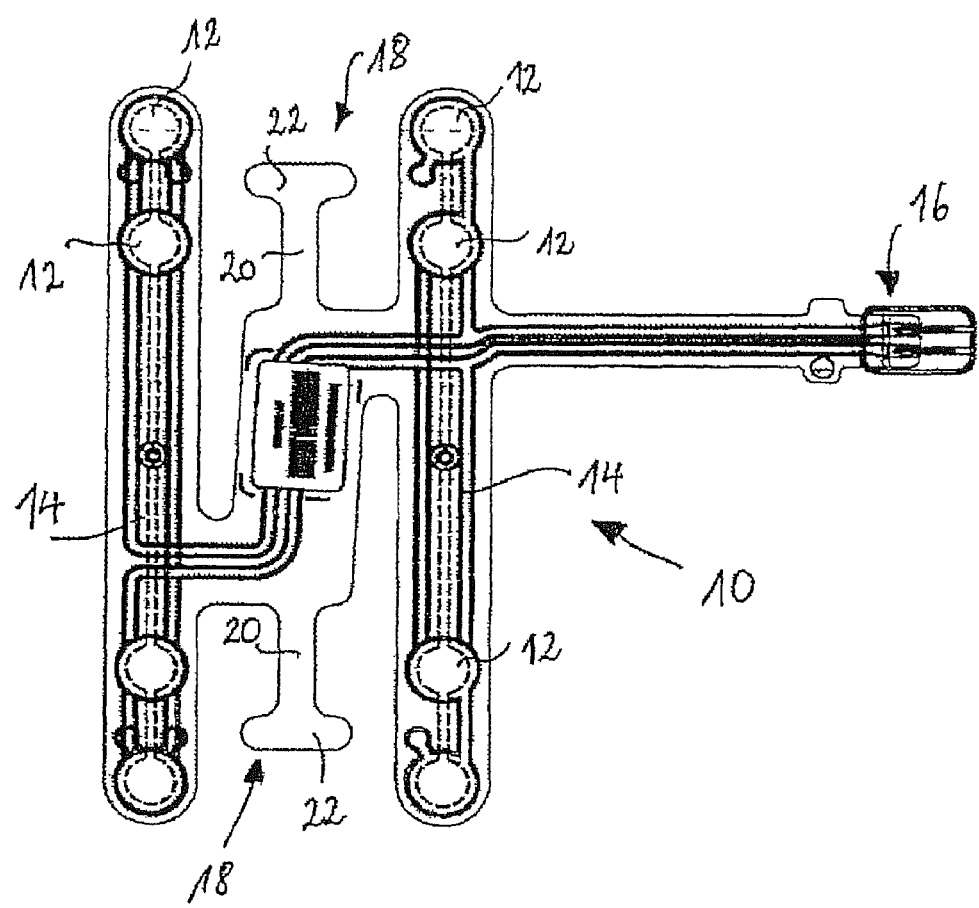
FIG. 1: is a top view of a sensor mat provided with anchor tabs.

Referring now to FIG. 1, there is shown a sensor mat 10, which is adapted for use with a vehicle seat. The sensor mat 10 comprises a foil-type structure wearing pressure-sensing elements 12 and circuits 14, which are effective to sense pressure applied to the sensing mat 10, such as the pressure imparted by an individual sitting on the seat or by an object placed thereon and to generate one or more electrical signal(s) in response to such pressure detection. The pressure-sensitive elements 12 and the circuits 14 are electrically connectable to a control unit via the connection "tail" 16 of the sensor mat 10. It will be appreciated that a pressure sensor is chosen here for illustration: other types of foil-type sensors can also be fixed to a seat foam according to the principles of the present invention.

The sensor mat 10 further comprises anchor tabs 18 projecting from the sensor mat. In the preferred embodiment, the anchor tabs are punched or otherwise formed from resilient non-functional regions of the sensor mat 10. The anchor tabs 18 preferably comprise a generally narrow stem portion 20 and a broader head portion 22. FIG. 1 shows two T-shaped anchor tabs 18 projecting into opposed directions from diametrical locations of the sensor mat 10.

FIGS. 2-4 show different views of an anchor tab 18 inserted into a corresponding incision 24 of the seat foam 26 according to a first embodiment of the invention (the hidden contour of anchor tab 18 is indicated in FIG. 2 by the dashed line 19). The incision 24 can be formed by insert moulding during or cutting after the foaming process. The incision 24 has at its bottom a channel 28 for accommodating the anchor tab, which extends from the surface into the seat foam 26, in a direction away form the sensor mat 10 (shown only schematically). In the proximal region, the channel bends into the foam body 26 of the seat. In the shown embodiment, the channel remains substantially parallel to the foam surface in its distal region. The seat foam comprises several retaining lobes 30, 32, 34 overlapping partially the channel and fixing the anchor tab 18 in the direction perpendicular to the foam surface. Seen from above, the incision 24 and the anchor tab 18 are substantially T-shaped, so that the anchor tab 18 cannot slip out of the incision 24 along the channel 28. The anchor tab 18 is thus fixed in the three directions of space.

The channel 28 has essentially the dimensions of the anchor tab 18. The width Wd of the channel in the distal region is about two or three times the width Wp of the channel in the proximal region. Due to the resiliency of the foam material 26, the size of the channel 28 can be a little smaller than the anchor tab 18, which results in a tight and durable fit of the anchor tab 18 to the seat foam 26.

FIGS. 5-7 illustrate a second embodiment of the invention, which differs from the first embodiment in that the incision comprises a first narrow vertical slit 36 and a second narrow vertical slit 38. The first slit 36 extends over the entire length of the channel 28. In the distal region of the channel, the vertical slit 38 extends transversally with respect to the first slit 36. To insert the anchor tab 18 into the channel 28, the slits 36, 38 are widened to let the anchor tab 18 pass. As the slits 36, 38 are so narrow that the lobes 30, 32, 34a, 34b of the channel roof are in contact or almost in contact when the anchor tab 18 is lodged in the incision, the latter is hardly perceptible by touch.

Figure 9:
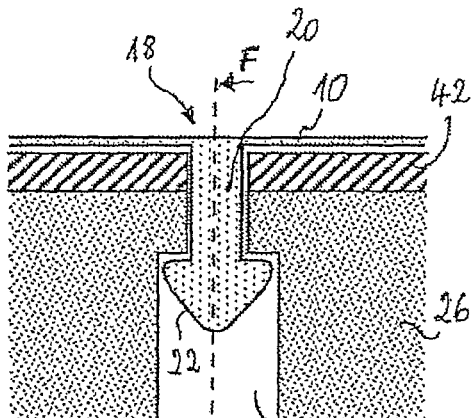
FIG. 9: is a cross-sectional view along the line E-E of FIG. 8.
Figure 10:
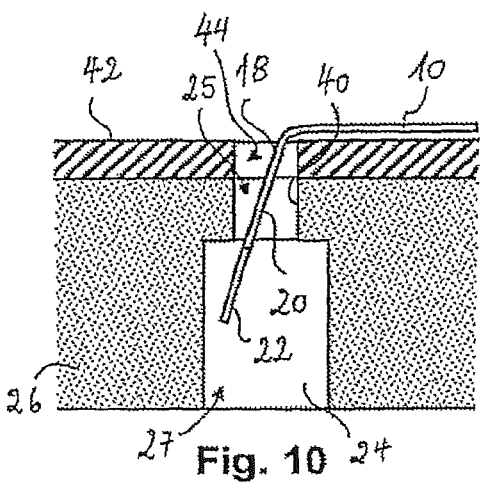
FIG. 10: is a cross-sectional view along the line F-F of FIGS. 8 and 9.
Figure 8:
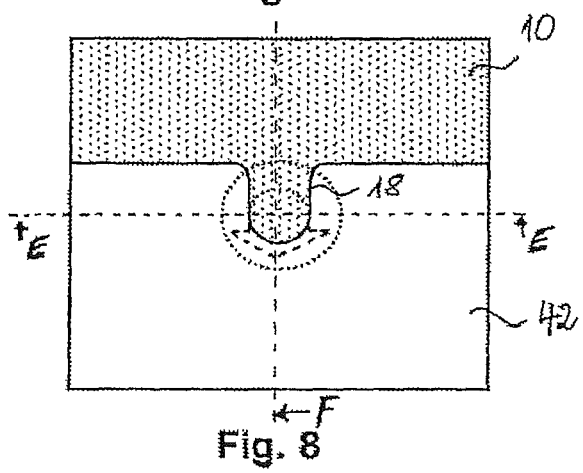
FIG. 8: is a top view of an anchor tab inserted into an incision in the seat foam according to a third embodiment of the invention.
Figure 11:
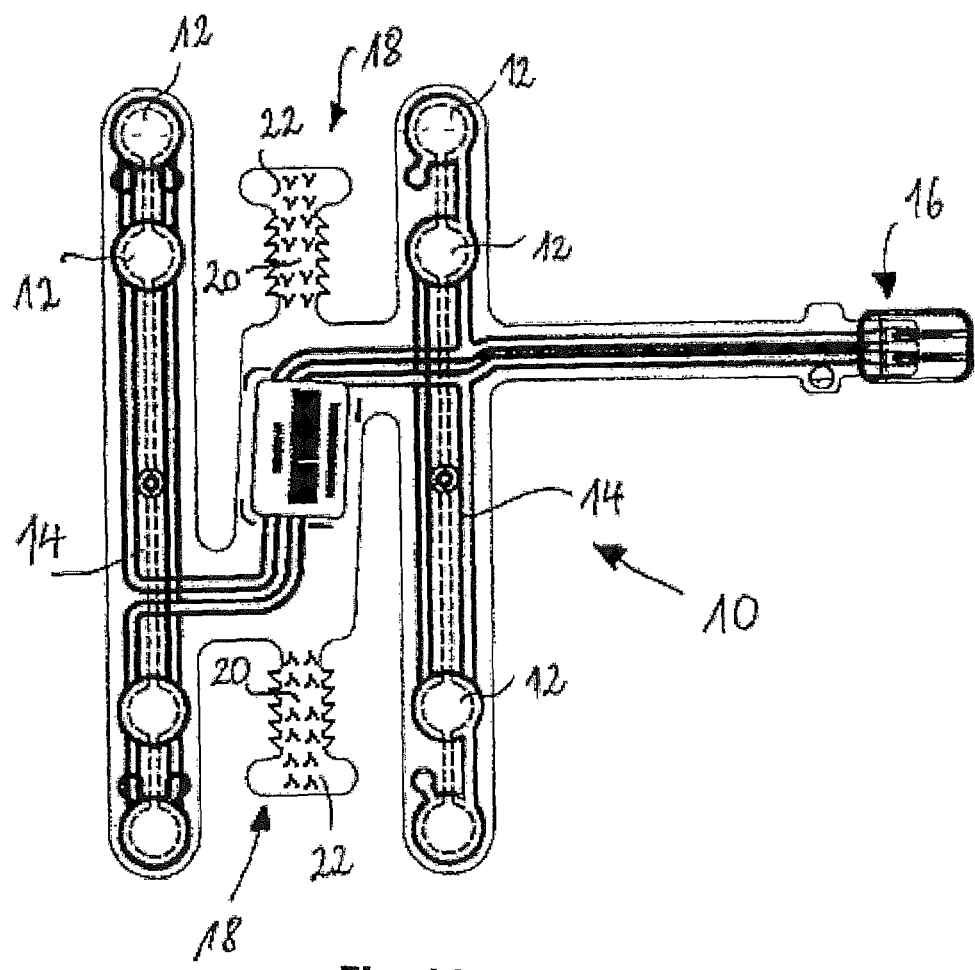
FIG. 11: is a top view of a sensor mat with anchor tabs including a roughened contour and surface.

FIGS. 8-10 illustrate a third embodiment of the invention. The incision is in this case a cavity 24 that extends substantially vertically with respect to the surface of the seat foam and whose vertical cross section exhibits generally the shape of an inverted T. The cavity 24 has an upper (i.e. closer to the surface) cylindrical portion 25 with a first diameter and a lower (i.e. farer from the surface) cylindrical portion 27 with a second diameter, which is substantially higher than the diameter of the upper portion 25. In the illustrated case, the diameter of the lower portion 27 amounts to about twice the first diameter of the upper portion 25. The seat foam 26 thus comprises a substantially annular section 40 located circumferentially around the upper portion 25 of the cavity 24 and above the lower portion 27 of the cavity 24 that retains the anchor tab 18 within the cavity 24. The seat foam 26 is in this example covered with a textile layer 42, e.g. a three-dimensional spacer fabric. The textile layer 42 has an aperture 44 above the location where the cavity 24 is arranged in the foam 26.

The sensor mat 10 comprises an anchor tab 18, shown in this example as arrow-shaped, with a narrow stem portion 20 and a larger, substantially triangular head portion 22. It should be noted, however, that this embodiment of the invention is not limited to the particular shown design of the head portion 22; indeed, the anchor tab 18 could equally well be implemented with a T-shape.

The length of the stem portion 20 and the length of the upper portion 25 of the cavity 24 are adapted to each other so that the head portion 22 is lodged in the lower portion 27 of the cavity 24 when the anchor tab 18 is inserted therein. The widths of the stem portion 20 and the head portion 22 are adapted to the diameters of the upper and lower portions 25, 27 of the cavity 24, respectively.

Although the cavity 24 is shown in the example as reaching through the entire foam layer 26, those skilled will be aware that the cavity 24 could also be implemented as a pocket hole. Preferably the diameters of the upper and lower portions 25, 27 of the cavity 24 are chosen such that one can insert the anchor tab 18 therein with a finger. It should also be noted that the shape of the horizontal cross section of the cavity portions 25, 27 is not limited to cylindrical but may also be rectangular, elliptical or polygonal.

The invention claimed is:

1. An assembly comprising a seat foam and a sensor mat, said seat foam having at least one incision and said sensor mat having at least one anchor tab integrally formed with said sensor mat and adapted to be inserted into said at least one incision, thereby securely holding said sensor mat on a surface of said seat foam, wherein said anchor tab is terminates in a substantially T-shaped tab end, and said incision includes a substantially T-shaped channel, wherein said T-shaped tab end is disposable within said T-shaped channel to abut said T-shaped channel at surfaces defining said channel, retaining said anchor tab in said incision.

2. An assembly according to claim 1, wherein said channel extends from the surface into said seat foam in a direction heading away from said sensor mat wherein said seat foam comprises at least one retaining element at said incision, and wherein said retaining element comprises a foam portion between said channel and the surface.

3. An assembly according to claim 2, wherein said incision comprises a slit between the surface and said channel extending along the channel, wherein said retaining element comprises at least one foam lobe at least partially overlapping said channel between said channel portion and the surface.

4. An assembly according to claim 2, wherein said channel comprises a proximal region and a distal region, said distal region being farther away from said sensor mat and wherein said channel is broader in said distal region than in said proximal region.

5. An assembly according to claim 4, wherein said anchor tab comprises a stem corresponding to said proximal region and a head corresponding to said distal region, said head and stem being integrally formed, and said head being broader than the proximal region of said channel.

6. An assembly according to claim 1, wherein said anchor tab is integrally formed with said sensor mat.

7. An assembly according to claim 1, wherein said anchor tab is removably fixed to said sensor mat.

8. An assembly according to claim 1, wherein said anchor tab comprises at least one of a roughened surface and a roughened contour, said at least one of said roughened surface and said roughened contour providing increased frictional adhesion to said seat foam.

9. An assembly according to claim 1, wherein said incision comprises a cavity extending substantially vertically with respect to the surface from the surface into said seat foam, said cavity comprising an upper portion and a lower portion, said upper portion being substantially narrower than said lower portion.

10. An assembly according to claim 1, wherein said seat foam is covered with a textile layer and wherein said sensor mat is disposed on said textile layer.

* * * * *